A. SCHEID.
RANGE BOILER STAND.
APPLICATION FILED MAY 17, 1921.

1,418,883.

Patented June 6, 1922.
2 SHEETS—SHEET 1.

Inventor
Adolph Scheid,

By
G. Hume Talbert
Attorney

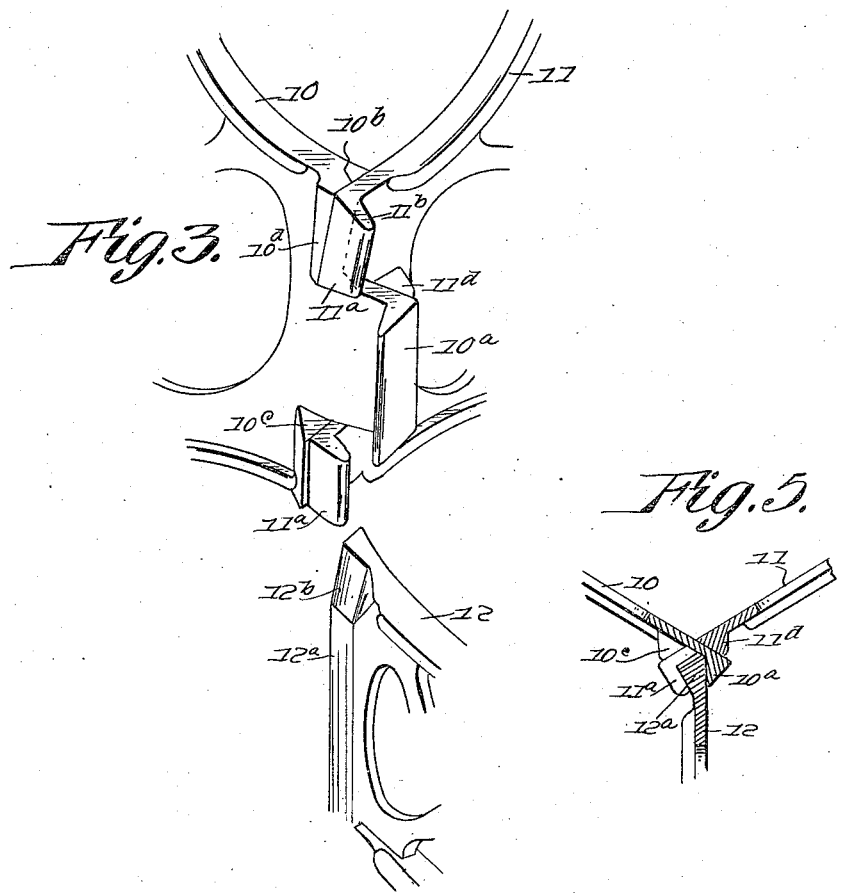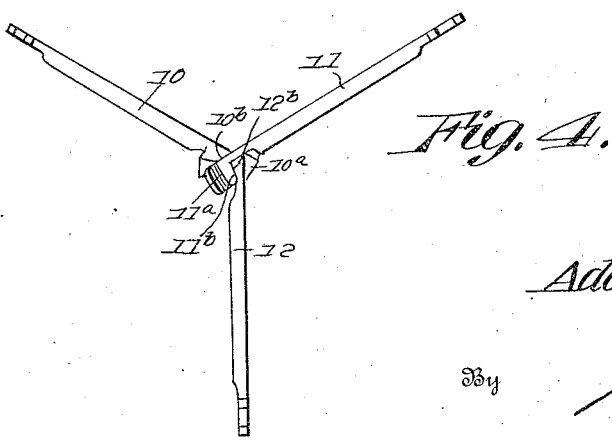

UNITED STATES PATENT OFFICE.

ADOLPH SCHEID, OF AUBURN, INDIANA.

RANGE-BOILER STAND.

1,418,883.   Specification of Letters Patent.   Patented June 6, 1922.

Application filed May 17, 1921. Serial No. 470,390.

*To all whom it may concern:*

Be it known that ADOLPH SCHEID, a citizen of the United States of America, residing at Auburn, in the county of Dekalb and State of Indiana, has invented new and useful Improvements in Range-Boiler Stands, of which the following is a specification.

The object of the invention is to provide a collapsible or knock-down tripod stand for range boilers, chairs, stools, tables and the like wherein the members constituting the legs or feet may be readily disconnected for packing or storing to occupy the minimum space for transportation or otherwise and wherein the substantial connection or erection of the parts can be accomplished without the employment of bolts, screws or other fastening means; and with this object in view the invention consists in a construction and combination of parts of which a preferred embodiment is shown in the accompanying drawings, wherein:—

Figure 3 is a similar view showing the interlocked members in engagement and the key member in position to be inserted into the seat formed by the interlocked members.

Figure 4 is a plan view, and

Figure 5 is a transverse sectional view through the joint on the plane indicated by the line 5—5 of Figure 1.

The stand comprises essentially three separable members 10, 11 and 12 of which the members 10 and 11 are provided with interlocking or intercurrent tongues respectively designated as $10^a$ and $11^a$ of respectively odd and even numbers as for example a single tongue $10^a$ for arrangement in a space between the separated tongues $11^a$, and said tongues are provided with terminal perpendicularly disposed ears respectively designated as $10^b$ and $11^b$ provided with opposed under-cut faces $10^c$ and $11^c$ which jointly form a vertical seat for the reception of a key $12^a$ carried by the member 12 and of a cross sectional contour corresponding with that of the seat, as for example dove-tailed as shown particularly in Figure 5.

Figure 1:
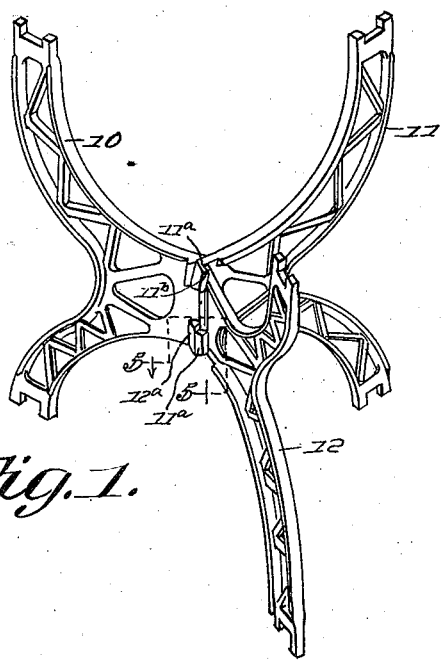
Figure 1 is a perspective view of a stand suitable for range boilers constructed in accordance with the invention.
Figure 2:
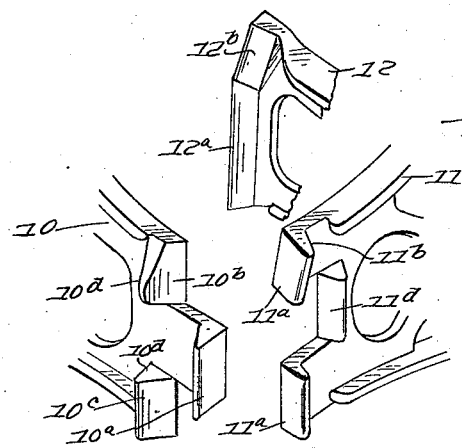
Figure 2 is a similar view showing the elements of the interlock carried respectively by the members of the stand disconnected and arranged in the relative positions which they occupy just prior to engagement.

The key is insertable longitudinally into the seat from the lower end thereof as will be indicated by the relative positions of the parts in Figures 2 and 3, and is of such a longitudinal shape as to limit its movement in the seat as for example by being tapered as shown and further, preferably, by being beveled or reduced more or less sharply as indicated at $12^b$ at its upper end to correspond with the lateral inward deflection of the inner face of the upper ear $11^b$, to the end that when the parts are engaged as indicated in Figure 1 they are secured against accidental disengagement, and are not subject to relative movement by a weight or pressure applied downwardly thereto, and can be disengaged only by an independent downward movement of the member 12 with relation to the members 10 and 11 to withdraw the key from the seat. The stability and resistance of the joint to disengagement of the elements may be assured, after the parts have been united, by lightly tapping the upper ends of the members 10 and 11 in alignment with the key, or similarly tapping the lower end of the key by means of a hammer or like implement.

To assure the proper relative angular position of the members 10 and 11 the former is provided with enlargements $10^d$ of which the faces $10^e$ are obliquely disposed with reference to the plane of said member to constitute seats for the tongues $11^a$ of the member 11. The member 11 moreover is provided with a similar obliquely disposed seat $11^d$ for the tongue of the member 10, to the end that when the members are engaged as described they are rigidly braced against relative angular movement.

Having described the invention what is claimed as new and useful is:—

1. A tripod stand comprising separable members having interlocked intercurrent tongues provided with ears having opposed under-cut faces jointly forming a seat, and a further member having a key insertable from below and movable vertically to engage said seat.

2. A tripod stand comprising members having interlocked intercurrent tongues provided with terminal ears having opposed under-cut faces jointly forming a cross sectionally dove-tailed seat and a third member having a cross sectionally dove-tailed key insertable from below and movable vertically to engage said seat.

3. A tripod stand comprising members having interlocked intercurrent tongues provided with terminal ears having opposed under-cut faces jointly forming a cross sectionally dove-tailed seat and a third member having a cross sectionally dove-tailed key insertable from below and movable vertically to engage said seat, the seat and key being tapered toward their upper ends to preclude relative longitudinal movement in one direction.

4. A tripod stand comprising members having interlocked intercurrent tongues provided with terminal ears having opposed under-cut faces jointly forming a cross sectionally dove-tailed seat and a third member having a cross sectionally dove-tailed key to engage said seat, the ear of one of the interlocked tongues being laterally deflected and the key being terminally reduced for engagement therewith.

5. A tripod stand comprising members having interlocked intercurrent tongues provided with terminal ears having opposed under-cut faces jointly forming a cross sectionally dove-tailed seat and a third member having a cross sectionally dove-tailed key to engage said seat, the first named members being provided respectively with seats disposed in oblique relation with the planes of the members for the respective bearing of the tongues of said members.

In testimony whereof he affixes his signature.

ADOLPH SCHEID.